(12) United States Patent
Munter et al.

(10) Patent No.: US 8,004,540 B1
(45) Date of Patent: Aug. 23, 2011

(54) DISPLAY RESOLUTION BOUNDARY

(75) Inventors: Aaron Munter, San Francisco, CA (US); Tim Allen, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 921 days.

(21) Appl. No.: 11/545,989

(22) Filed: Oct. 10, 2006

(51) Int. Cl.
*G09G 5/00* (2006.01)

(52) U.S. Cl. ........................ 345/629; 345/2.2

(58) Field of Classification Search .................. 345/629, 345/2.2

See application file for complete search history.

(56) References Cited

U.S. PATENT DOCUMENTS

| | | | | |
|---|---|---|---|---|
| 5,651,107 A | * | 7/1997 | Frank et al. | 715/768 |
| 5,892,511 A | * | 4/1999 | Gelsinger et al. | 715/794 |
| 6,088,018 A | * | 7/2000 | DeLeeuw et al. | 345/156 |
| 6,353,450 B1 | * | 3/2002 | DeLeeuw | 715/768 |
| 6,677,979 B1 | | 1/2004 | Westfield | |
| 6,717,607 B1 | | 4/2004 | Lauper et al. | |
| 7,091,974 B2 | * | 8/2006 | Masera et al. | 345/428 |
| 2003/0142138 A1 | * | 7/2003 | Brown et al. | 345/797 |
| 2004/0257433 A1 | | 12/2004 | Lia et al. | |
| 2006/0087553 A1 | | 4/2006 | Kenoyer et al. | |
| 2006/0158510 A1 | | 7/2006 | Lia et al. | |

* cited by examiner

*Primary Examiner* — Jeffery A Brier
(74) *Attorney, Agent, or Firm* — Robert C. Kowert; Meyertons, Hood, Kivlin, Kowert & Goetzel, P.C.

(57) ABSTRACT

A method is provided to retrieve a display resolution used by a computing device in an online conference. With the display resolution, a boundary associated with the display resolution is displayed. The boundary is configured to define a display area shown on the computing device.

19 Claims, 7 Drawing Sheets

DISPLAY RESOLUTION BOUNDARY

FIELD OF THE INVENTION

The present invention relates generally to software and, more particularly, to display resolution boundary.

BACKGROUND

Online conferencing is a set of interactive communication technologies that allow two or more locations to interact, for example, by way of real-time two-way video and audio transmissions. An online conference system typically includes cameras to capture video, speakers to output sounds, and microphones to capture sounds. In an online conference, a participant may communicate and share data with other participants. For example, participants of an online conference can see still or motion video images of each other. In another example, a participant may share texts, audio, images, and video in real time with other participants in the online conference.

The computing devices used in the online conferencing may use different display resolutions. A display resolution may be the number of pixels creating a display. In an online conference, a presenter sharing an image of his display may have his display set at a higher resolution than other computing devices in the online conference. A low resolution has a low number of pixels, and therefore results in an image with low detail. Other participants in the online conference with lower display resolutions may therefore not see the entire image. As a result, if the presenter is referring to a portion of the image not shown on the other computing devices, other participants may interrupt the presentation to address their problem. One solution is to have the image automatically scaled such that the entire image is displayed. However, scaling reduces the level of detail in an image. Some computing systems may make the image scrollable over the display area, but such scrolling can be onerous for a participant viewing the image.

In view of the foregoing, there is a need for continuing efforts to track the display resolutions used by participants of an online conference.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

The embodiments described herein provide methods, devices, systems, and graphic user interfaces for providing display resolution boundaries. In general, boundaries may be displayed on a display. The boundaries define the outer limits of display areas shown on the displays of other computing devices participating in an online conference. In addition to the boundaries, as explained in more detail below, the display areas defined by the boundaries may be shaded or turned opaque to indicate a number of computing devices that use the particular display resolutions associated with the boundaries.

Figure 1:
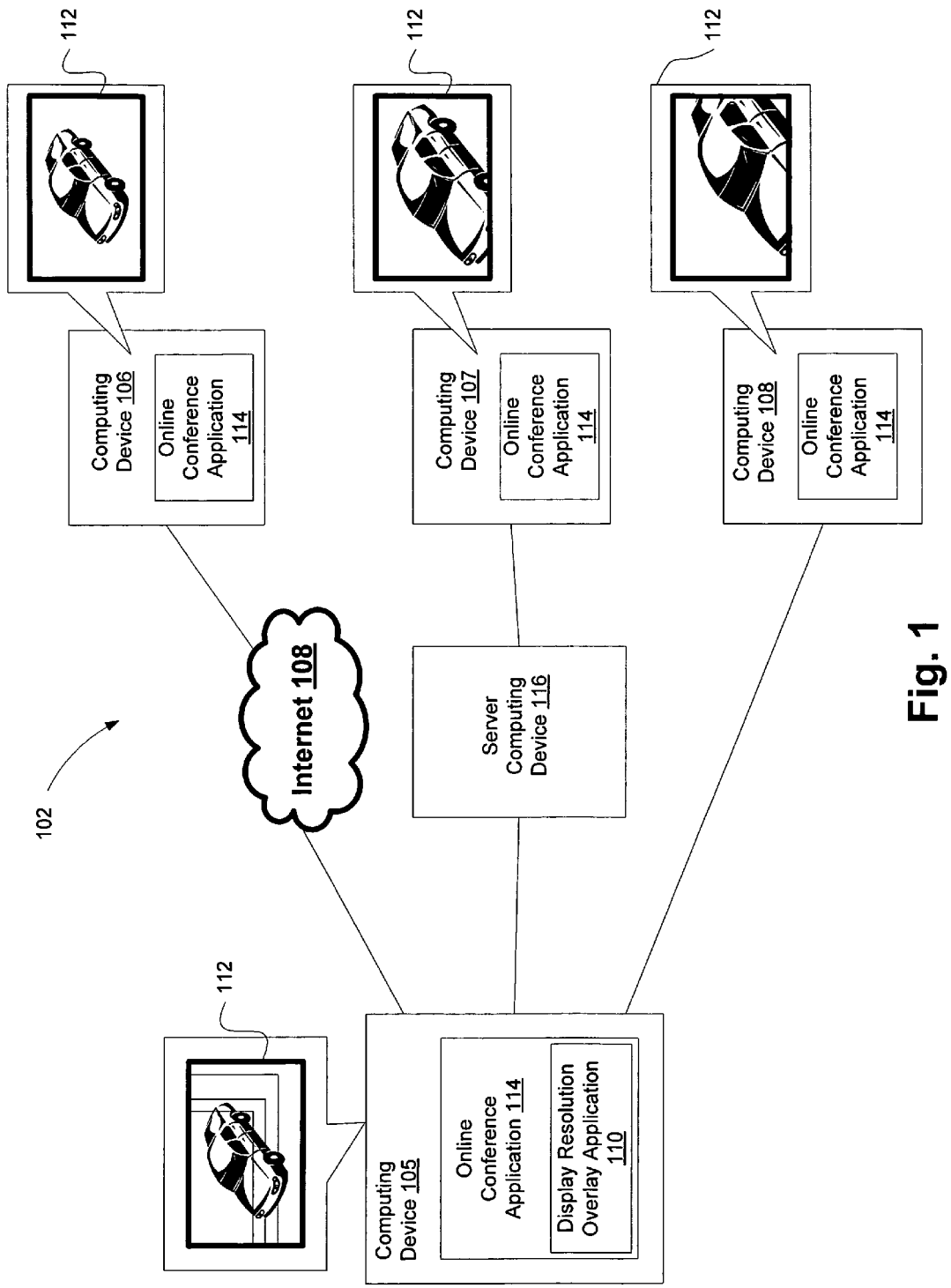
FIG. 1 is a simplified block diagram of an online conference system, in accordance with an embodiment.

FIG. 1 is a simplified block diagram of an online conference system, in accordance with an embodiment. As shown in FIG. 1, online conference system 102 includes computing device 105 in communication with computing devices 106-108. Computing devices 105-108 may be in communication through a computer network. For example, a computer network can include communication between computing device 105 and computing device 106 through Internet 108. Alternatively, a computer network can include a direct connection between computing device 105 and computing device 108. In another example, computer network can include computing device 105 in communication with computing device 107 by way of server computing device 116. Server computing device 116 provides services or data to computing devices 105 and 107. For example, server computing device 116 may include a Web server that is configured to receive Hypertext Transfer Protocol (HTTP) requests and to serve Web pages.

In general, an online conference may allow two or more applications, such as online conference applications 114, hosted at different locations to interact and/or collaborate by sharing data. Online conference system 102 allows two or more online conference applications 114 hosted on computing devices 105-108 to share or communicate data. An example of online conference system 102 includes a video conference system. In a video conference system, computing devices 105-108 may interact with each other by way of simultaneous two-way video and audio transmissions. Such video conference system may include video cameras to capture video, speakers to render audio, and microphones to capture audio. Other online conferences may include multiplayer game sharing, application sharing, whiteboard conferencing, and other online conferences.

Online conference application 114 hosted on computing device 105 may share or communicate data with online conference applications 114 hosted on computing devices 106-108 or, alternatively, on server computing device 116. As shown in FIG. 1, for example, online conference application 114 hosted on computing device 105 can transmit an image, such as an image of a car, to online conference applications 114 hosted on computing devices 106-108. Display area 112 shows the visible area displayed by computing devices 105-108 on a display, such as a cathode ray tube (CRT) or liquid crystal display (LCD). Depending on display resolutions in use, computing devices 106-108 and server computing device 116 may display all or portions of the image transmitted from computing device 105. The display resolution may be the number of pixels creating a display. For example, the display resolution can be expressed in terms of the physical number of columns and rows of pixels creating the display (e.g., 800×600, 852×480, 1024×768, 1368×768, and other display resolutions).

Computing device 105 can also host display resolution overlay application 110. Display resolution overlay application 110 may be associated with online conference application 114. For example, display resolution overlay application 110 may be integrated with online conference application 114. In another example, display resolution overlay application 110 may be a plug-in application that is loaded into online conference application 114. A plug-in application is a computer program that operates within the confines of online conference application 114. In other examples, display resolution overlay application 110 may also be a helper object software, a standalone application, or other application types. As explained in more detail below, display resolution overlay application 110 may display one or more boundaries associated with display resolutions used by computing devices 106-108 or on a display (not shown) in data communication with server computing device 116. A boundary is configured to show or define to a user a display area (e.g., the display area 112) on computing devices 106-108 or server computing device 116.

Figure 2:
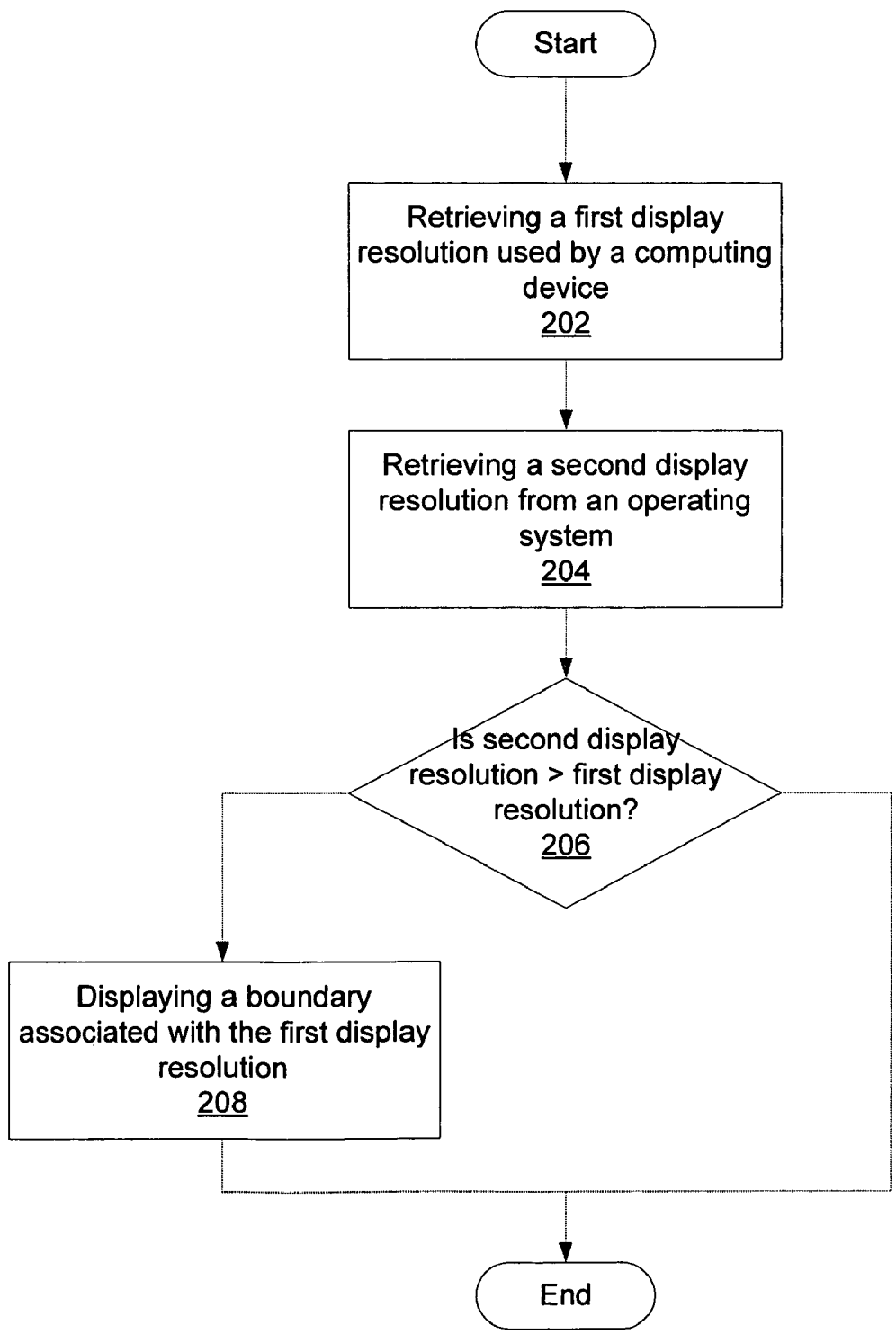
FIG. 2 is a flowchart diagram of a general overview for providing a boundary associated with a screen resolution, in accordance with an embodiment.

FIG. 2 is a flowchart diagram of a general overview for providing a boundary associated with a display resolution, in accordance with an embodiment. As shown in FIG. 2, a computing device retrieves a first display resolution used by another computing device in operation 202. A computing device may be implemented as described above in FIG. 1 for computing devices 106-108, server computing device 116, and others. The computing devices may be associated with an online conference. To retrieve the first display resolution, the computing device may send a request to the other computing device for the first display resolution and, in response, receives the first resolution. Alternatively, the other computing device may store the first display resolution on a remote server and the computing device may retrieve the first display resolution from the remote server.

The computing device also retrieves a second display resolution in operation 204. The second display resolution is the display resolution used by the computing device. The second display resolution may be stored in the operating system executed on the computing device because the operating system generally controls the display of images and therefore, controls and defines the display resolution. With the first and second display resolutions, a comparison is made in operation 206 to determine whether the second display resolution is greater than the first display resolution. Alternatively, a comparison can be made to determine whether the first display resolution is less than the second display resolution. If the second display resolution is greater than the first display resolution, then the computing device is using a greater display resolution than the other computing device. In other words, more pixels are displayed at the computing device than the other computing device. As a result, a boundary associated with the first display resolution is displayed at the computing device in operation 208. The boundary is configured to define a display area shown on the other computing device. In other words, the boundary is configured to define the outer limits of a visible area shown on the other computing device. On the other hand, if the second display resolution is less than the first display resolution, then no boundary is displayed at the computing device.

Figure 3:
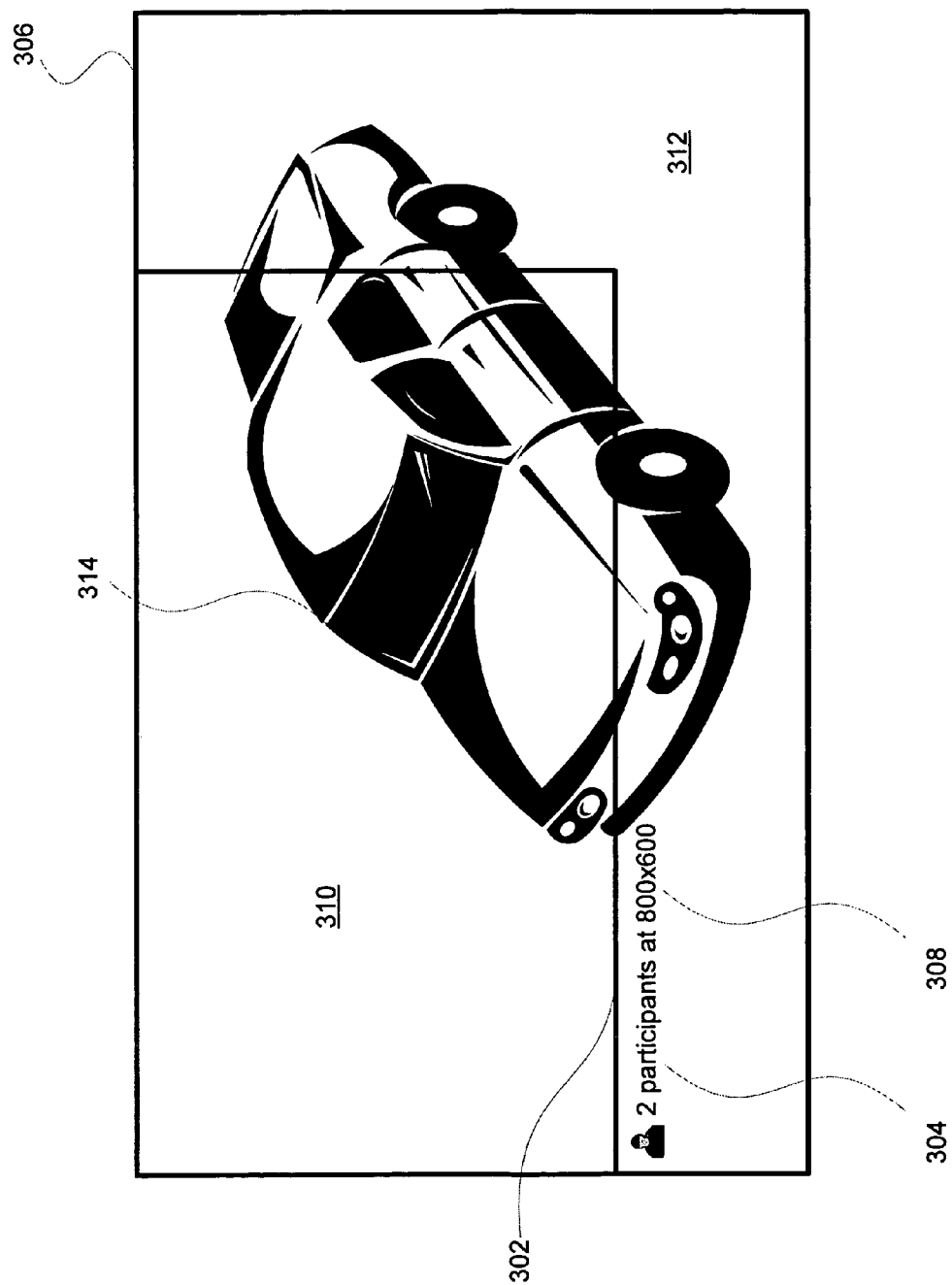
FIG. 3 is a screenshot of a display area with a boundary, in accordance with an embodiment.

FIG. 3 is a screenshot of a display area with a boundary, in accordance with an embodiment. As shown in FIG. 3, display area 306 shows image 314 of a car and includes boundary 302 associated with a display resolution used by other computing devices. Displayed along with boundary 302 is a graphical user interface (GUI) that includes first region 304 and second region 308. The displayable appearance of boundary 302 can be defined by a variety of geometric shapes (e.g., line segments, dotted line segments, contours, curves, rectangles, squares, circles, triangles, and other shapes), alphanumeric characters (e.g., A, v, t, Q, 1, 9, 10, and other characters), symbols (e.g., $, *, @, ▼, □, ¤. ♥, and other symbols), shadings, patterns (e.g., solid, hatch, stripes, dots, and other patterns), and colors. For example, in an embodiment, boundary 302 of FIG. 3 is comprised of four line segments that define a rectangle.

Boundary 302 is configured to define a display area shown on the other computing devices. Image 314 is shared or transmitted to other computing devices in an online conference that uses a lower display resolution, such as 800×600. Accordingly, display area 310 inside boundary 302 is the display area shown on the other computing devices. Display area 312 outside boundary 302 is not included in the display area shown on the other computing devices. In this example, boundary 302 encompasses display area 310. The native display resolution associated with display area 306 is higher than display resolution of 800×600 defined by boundary 302. Display area 306 therefore encompasses both display areas 310 and 312. Accordingly, boundary 302 indicates that portion of image 314 within display area 310 is displayed by the other computing devices, while portion of the image shown in area 312 may not be displayed by the other computing devices.

In addition, displayed along with boundary 302 is a GUI that includes first region 304 and second region 308. Second region 308 is configured to define the display resolution used by the other computing devices. Alternatively, second region 308 can also define the display resolution associated with boundary 302. For example, second region 308 may include alphanumeric texts such as, "800×600," "852×480," or "1024×768," that defines the display resolution. First region 304 defines a number of computing devices using the display resolution. The number of computing devices can be a count or an aggregate of the other computing devices that use the display resolution defined in second region 308. For example, if two "800×600" display resolutions are retrieved from two computing devices in an online conference, then first region 304 defines a number of two.

Figure 4:
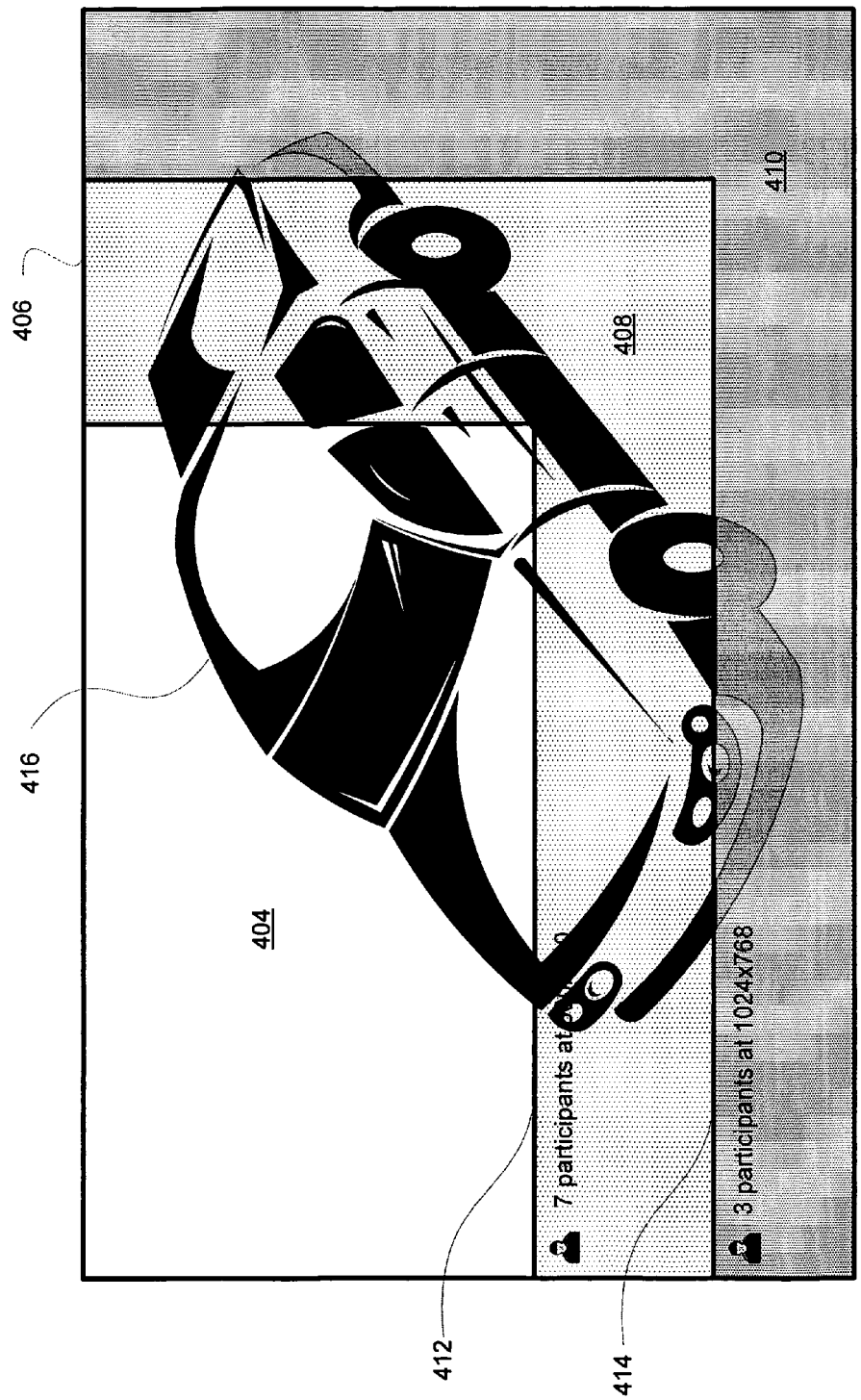
FIG. 4 is a screenshot of opaque display areas with boundaries, in accordance with an embodiment.

FIG. 4 is a screenshot of opaque display areas with boundaries, in accordance with an embodiment. As shown in FIG. 4, display area 406 shows image 416 of a car and includes two boundaries 412 and 414 associated with two different display resolutions used by other computing devices. Image 416 is shared or transmitted to the other computing devices in an online conference. The two display resolutions are retrieved from the other computing devices and the boundaries are displayed in display area 406. Boundary 412 is associated with a display resolution of 800×600 and boundary 414 is associated with a display resolution of 1024×768. In this example, boundary 412 encompasses display area 404. Since display resolution of 1024×768 is higher than display resolution of 800×600, boundary 414 encompasses more display area, namely display areas 404 and 408. Here, the native display resolution associated with display area 406 is higher than both display resolutions 800×600 and 1024×768 defined by boundaries 412 and 414. Accordingly, display area 406 encompasses display areas 404, 408, and 410.

As shown in FIG. 4, display areas 404, 408, and 410 may be opaque. In addition to boundaries 412 and 414, the opacities of display areas 404, 408, and 410 provide a visual cue of what other participants in the online conference can see. For example, in an embodiment, the opacity may correlate to a number of computing devices in the online conference using a particular display resolution. In an embodiment, the degree of opacity may be expressed as $$\text{Opacity} = \left(1 - \frac{NC}{TC}\right) * 100 \quad (1.0)$$

where NC is the number of computing devices using a display resolution that is equal to or higher than a particular display resolution and TC is the total number of computing devices in the online conference or in a room of the online conference. As shown in Equation 1.0, a large number of computing devices using a particular display resolution would result in a less opaque display area while a small number of computing devices using a particular display resolution would result in a more opaque display area. For example, if seven out of ten computing devices are using an 800×600 display resolution and the three other computing devices are using a higher display resolution of 1024×768, then the number of computing devices using the 800×600 or higher display resolution is equal to ten. Applying Equation 1.0, the degree of opacity associated with display area 404 is (1−10/10)*100=0% opacity, which is 100% transparent. On the other hand, since three out of ten computing devices are using the 1024×768 display resolution, then the number of computing devices using the 1024×768 or higher resolution is equal to three. Applying Equation 1.0, the degree of opacity associated with display area 408 is (1−3/10)*100=70% opacity, which, as shown in FIG. 4, is more opaque than display area 404.

The opacity of display areas 404, 408, and 410 can be changed by changing the opacity of one or more pixels within boundaries 412 and 414. Opacity of a pixel associated with display area 404, 408, or 410 may be changed by a variety of graphical manipulation techniques. For example, the brightness of a pixel may be changed to correlate with a degree of opacity. In another example, the color of the pixel may be changed to correlate with the degree of opacity.

Figure 5:
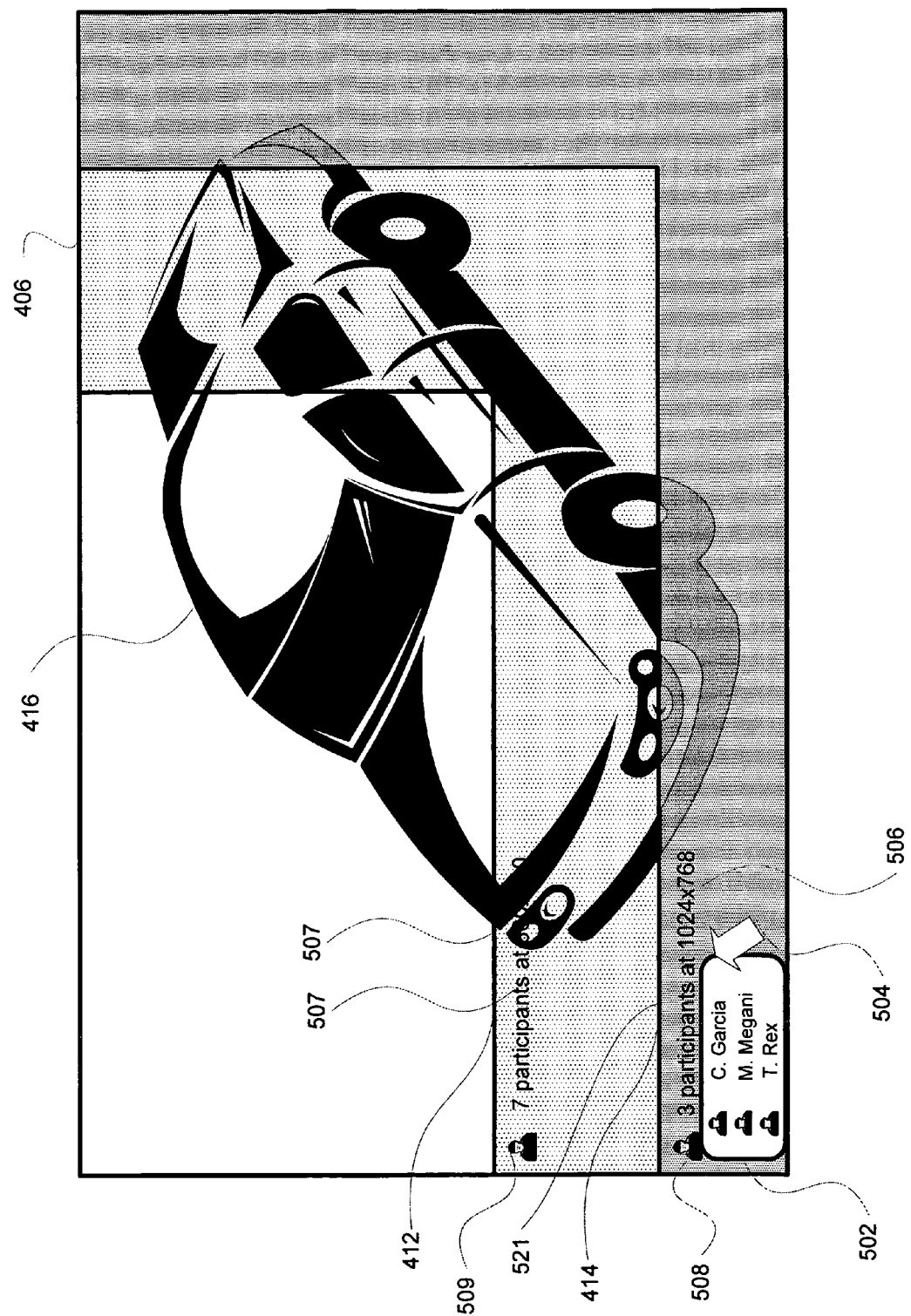
FIG. 5 is a screenshot of a display area with boundaries and graphics user interfaces (GUI) regions, in accordance with an embodiment.

FIG. 5 is a screenshot of a display area with boundaries and GUI regions, in accordance with an embodiment. Similar to FIG. 4, display area 406 of FIG. 5 shows image 416 of a car and includes two boundaries 412 and 414 associated with two different display resolutions used by other computing devices. Displayed along with boundaries 412 and 414 are GUIs 508 and 509. Each of GUI 508 or 509 includes first region 520 or 521 and second region 506 or 507. First regions 520 and 521 define a number of computing devices using the display resolution. For example, first region 520 defines seven computing devices (or participants) using the 800×600 display resolution and first region 521 defines three computing devices using the 1024×768 display resolution.

A third region, such as third region 502, may be generated and displayed in response to a selection of first region 520 or 521. A user may select first region 520 or 521 by using cursor 504. A user may select first region 520 or 521 to provide more details in regard to the number of computing devices using the display resolution. In the embodiment of FIG. 5, third region 502 shows or lists identifiers associated with the computing devices that are using the 1024×768 display resolution. The identifiers may be retrieved with the display resolution from the other computing devices that are in the online conference. An identifier can be one or more symbols, numbers, characters, and/or other data that establish the identity of a user, an online conference application, or a computing device in the online conference. For example, as shown in FIG. 5, third region 502 shows each identifier associated a computing device or user that uses the 1024×768 display resolution, namely "C. Garcia," "M. Megani," and "T. Rex."

Figure 6:
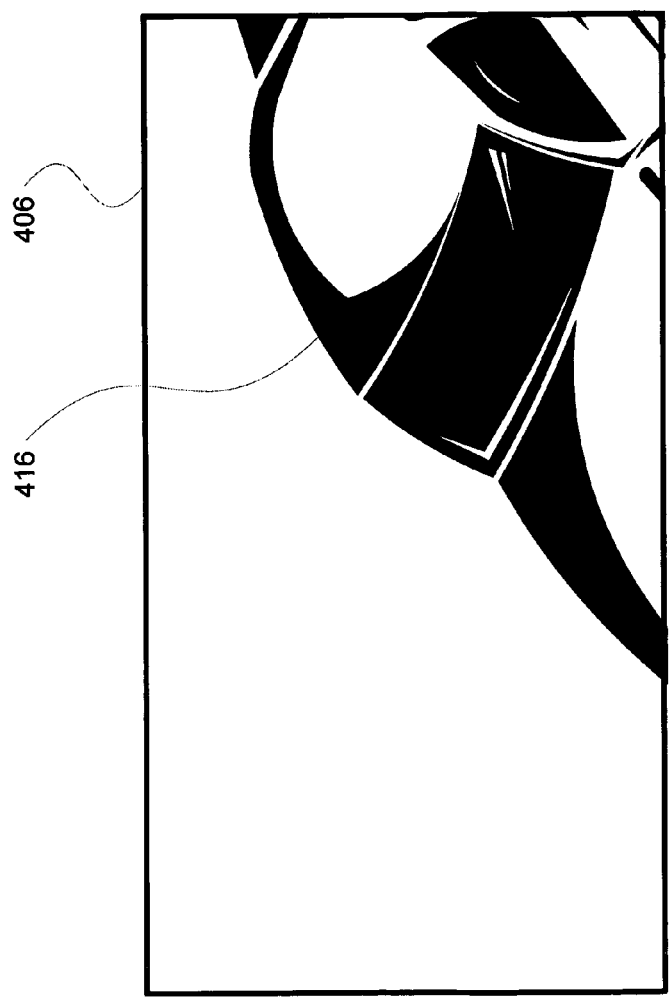
FIG. 6 shows a screenshot of the display area as a result of the display resolution change, in accordance with an embodiment.

Second regions 506 and 507 are configured to define the display resolutions used by other computing devices. If a user wants to switch to the screen resolution shown in second regions 506 and 507, the user may select one of the second regions using, for example, cursor 504. As a result of the selection, the display resolution of the computing device changes to the selected display resolution. In the example of FIG. 5, a user may select second region 507 to switch to an 800×600 display resolution. FIG. 6 shows a screenshot of the display area as a result of the display resolution change, in accordance with an embodiment. As shown in FIG. 6, a display resolution of 800×600 is less than the original display resolution. Since the resolution is lower, display area 406 shows a portion of image 416. It should be noted that the change in display resolution can be temporary. For example, the display resolution may automatically revert back to the original display resolution after the online conference has ended.

It should be appreciated that a variety of suitable layouts can be designed for region layouts illustrated above as FIGS. 3-6 do not represent all possible layout options available. The displayable appearance of the regions can be defined by a variety suitable geometric shapes (e.g., rectangle, square, circle, triangle, and other shapes), alphanumeric characters (e.g., A, v, t, Q, 1, 9, 10, and other characters), symbols (e.g., $, *, @, ▼, □, ¤, ♥, and other symbols), shadings, patterns (e.g., solid, hatch, stripes, dots, and other patterns), and colors. Furthermore, for example, first and second regions 520 and 507 shown in FIG. 5, or other regions, may be omitted or dynamically assigned. It should also be noted that the regions can be fixed or customizable. In addition, the computing devices displaying the GUIs may have a fixed set of layouts, utilize a defined protocol or language to define a layout, or an external structure can be reported to the computing device that defines a layout. Further, clicking on a region of GUI or providing an input through an input device, such as a keyboard, can trigger code to cause the functionality described herein.

Figure 7:
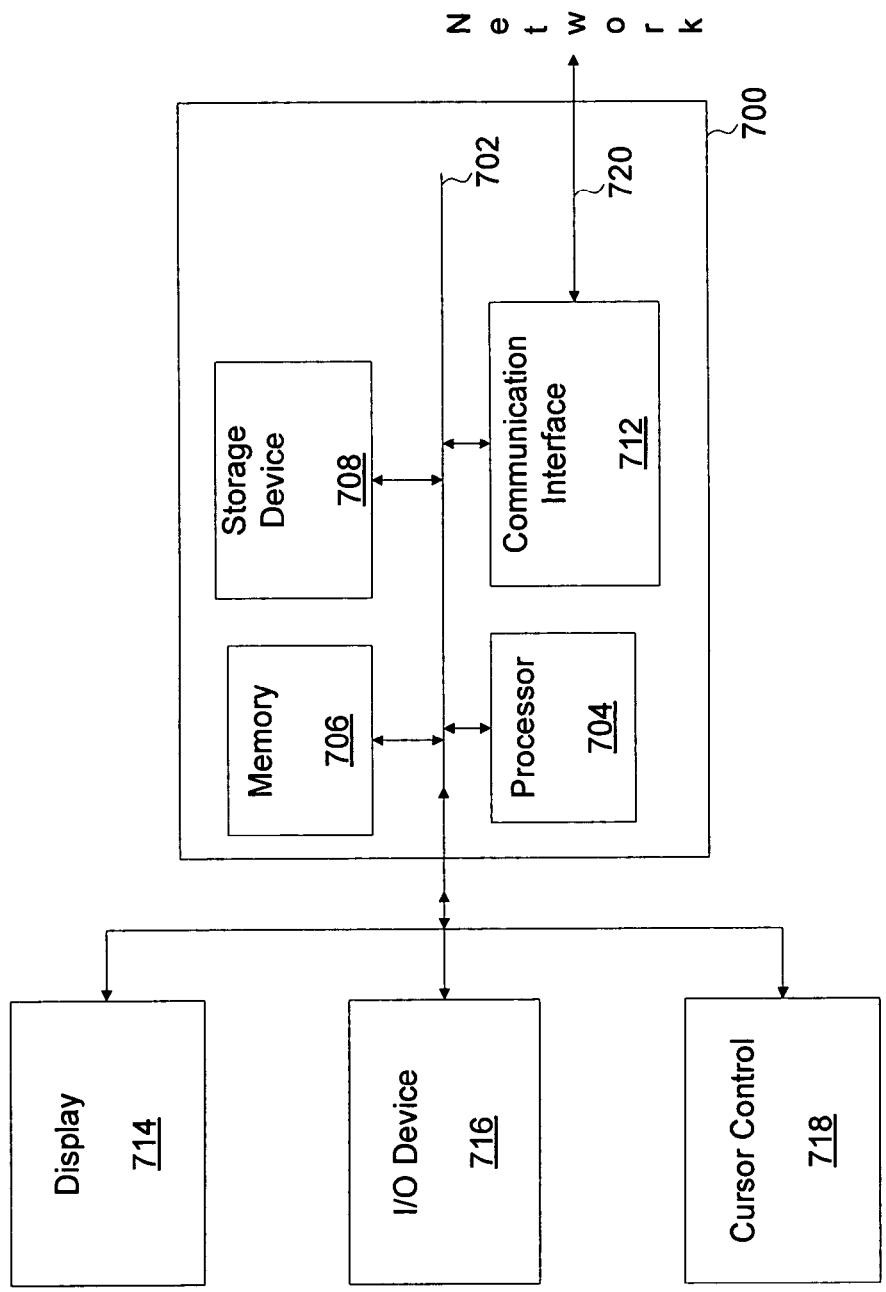
FIG. 7 is a simplified block diagram of an exemplary computer system that is suitable for processing and executing a display resolution overlay application, in accordance with an embodiment.

FIG. 7 is a simplified block diagram of an exemplary computer system that is suitable for processing and executing a display resolution overlay application, in accordance with an embodiment. In some embodiments, computer system 700 may be used to implement computer programs, logic, applications, methods, processes, or other software to provide information associated with communication latency. Exemplary computer system 700 includes a desktop computer, a server, a portable computing device, a personal digital assistant, a computational engine within an appliance, and other computer systems. As shown in FIG. 7, computer system 700 includes bus 702 or other communication mechanism for communicating information, which interconnects subsystems and devices, such as processor 704, system memory 706 (e.g., random access memory (RAM)), storage device 708 (e.g., read only memory (ROM), magnetic disk drives, optical disk drives, and other storage devices), communication interface 712 (e.g., modem or Ethernet card), display 714 (e.g., cathode ray tube (CRT) or liquid crystal display (LCD)), input/output device 716 (e.g., keyboard), and cursor control 718 (e.g., mouse or trackball).

In some embodiments, computer system 700 performs specific operations by processor 704 when executing one or more sequences of one or more program instructions stored in system memory 706. Such program instructions may be read into system memory 706 from another computer readable medium, such as storage device 708. In some embodiments, hard-wired circuitry may be used in place of or in combination with software program instructions to implement embodiments of the invention.

It should be appreciated that the term "computer readable medium" refers to suitable medium that participates in providing program instructions to processor 804 for execution. Such a medium may take many forms, including but not limited to, non-volatile media, volatile media, and transmission media. Non-volatile media may include, for example, optical or magnetic disks, such as storage device 708. Volatile media may include dynamic memory, such as system memory 706. Transmission media includes coaxial cables, copper wire, and fiber optics, including wires that comprise bus 702. Transmission media can also take the form of acoustic or light waves, such as those generated during radio wave and infrared data communications. Common forms of computer readable media include, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computer system 700. In other embodiments, two or more computer systems, such as computer system 700, coupled by communication link 720 (e.g., local area network (LAN), public switched telephone network (PSTN), wireless network, and other communication links) may perform the sequence of program instructions to practice the embodiments in coordination with one another. In addition, computer system 700 may transmit and receive messages, data, and instructions, including program, i.e., application code, through communication link 720 and communication interface 712. Received program instructions may be executed by processor 704 as the program instructions are received, and/or stored in storage device 708, or other non-volatile storage for later execution.

The above-described embodiments provide methods, devices, systems, and graphic user interfaces for providing a display resolution boundary. With the boundaries displayed, a user can quickly gage the display resolutions used by the other computing devices in the online conference. Furthermore, the user can be made aware of the display resolution discrepancies, and therefore, can see the portions of the display area that are not visible by other users. Accordingly the user can move or adjust a shared image to a display area that is visible to most or all the other users. Alternatively, the user can quickly and easily change his screen resolution by selecting a GUI region for optimal viewing by the other users.

Although the foregoing examples have been described in some detail for purposes of clarity of understanding, the embodiments are not limited to the details provided. There are many alternative ways of implementing the embodiments. The disclosed examples are illustrative and not restrictive.

What is claimed is:

1. A method, comprising:
retrieving a display resolution used by a remote computing device in an online conference;
wherein the remote computing device and a presenter computing device are both displaying conference content for said online conference;
displaying a boundary that represents the display resolution of the remote computing device, wherein the boundary is overlaid on the conference content and indicates a portion of the conference content visible on the presenter computing device and not visible on the remote computing device; and
wherein said retrieving and said displaying are performed by one or more computing devices.

2. The method of claim 1, further comprising:
determining a number of computing devices in the online conference using display resolutions greater than or equal to the display resolution of the remote computing device;
calculating an opacity that is inversely proportional to the determined number of computing devices;
setting an opacity of at least a portion of a display area within the boundary dependent on the calculated opacity.

3. The method of claim 1, further comprising:
retrieving an identifier associated with the remote computing device; and
displaying the identifier associated with the remote computing device.

4. The method of claim 1, further comprising displaying a number of computing devices in the online conference using the display resolution of the remote computing device.

5. The method of claim 1, further comprising displaying the display resolution of the remote computing device.

6. The method of claim 1, wherein the boundary comprises a plurality of line segments.

7. The method of claim 1, wherein the boundary is displayed on another computing device.

8. The method of claim 1, wherein the boundary is displayed on a server computing device.

9. A computer readable memory or storage device storing computer instructions for:
retrieving a first display resolution used by a first computing device;
retrieving a second display resolution used by a second computing device; and
wherein both the first computing device and the second computing device are displaying shared content;
comparing the first display resolution to the second display resolution;
in response to determining that the second display resolution is higher than the first display resolution, displaying a boundary that represents the first display resolution on the second computing device, wherein the boundary indicates a portion of the shared content visible on the second computing device and not visible on the first computing device due to the lower display resolution of the first computing device; and
in response to determining that the second display resolution is equal to or lower than the first display resolution, not displaying the boundary.

10. The computer readable memory or storage device of claim 9, further storing computer instructions for:
determining a number of computing devices in an online conference using display resolutions greater than or equal to the first display resolution;
calculating an opacity that is inversely proportional to the determined number of computing devices;

setting an opacity of at least a portion of a display area within the boundary dependent on the calculated opacity.

11. The computer readable memory or storage device of claim 9, further storing computer instructions for:

providing a selection of the first display resolution; and in response to selection of the first display resolution, changing the second display resolution used by the second computing device to the first display resolution.

12. A computer readable memory or storage device storing computer instructions for:

retrieving a plurality of display resolutions, wherein each display resolution is used by a respective one of a plurality of computing devices, and wherein each one of the plurality of computing devices is displaying shared content; and displaying a plurality of boundaries on a same one of the plurality of computing devices, wherein each one of the plurality of boundaries represents a respective one of the plurality of display resolutions and indicates a portion of the shared content visible on the one of the plurality of computing devices and not visible on one or more other ones of the plurality of computing devices using the respective one of the plurality of display resolutions.

13. A computing device, comprising:

a memory configured to store a display resolution overlay application and an operating system; and a processor in communication with the memory, the processor being configured to execute the operating system and the display resolution overlay application stored in the memory, the display resolution overlay application comprising program instructions for:

retrieving a first display resolution used by another computing device;

retrieving a second display resolution from the operating system;

displaying a boundary that represents the first display resolution, wherein the boundary provides a visual indication of a display area size shown on the another computing device;

determining a number of computing devices using display resolutions greater than or equal to the first display resolution;

calculating an opacity that is inversely proportional to the determined number of computing devices; and setting an opacity of at least a portion of a display area within the boundary dependent on the calculated opacity.

14. The computing device of claim 13, wherein the boundary is displayed if the first display resolution is lower than the second display resolution.

15. The computing device of claim 13, wherein the display resolution overlay application further comprises program instructions for:

providing a selection of the first display resolution; and in response to selection of the first display resolution, changing the second display resolution to the first display resolution.

16. The computing device of claim 13, wherein the boundary comprises a plurality of line segments.

17. The computing device of claim 13, wherein the computing device and the another computing device are associated with an online conference.

18. A computer readable memory or storage device storing computer instructions to implement a graphical user interface (GUI), comprising:

a user selectable first region configured to display a value of a first display resolution, wherein, in response to a selection of the first region, the computer instructions are configured to change a current display resolution to the first display resolution; and a user selectable second region configured to display a value corresponding to a number of computing devices in an online conference using the first display resolution, wherein, in response to a selection of the second region, the computer instructions are configured to generate a third region, wherein the third region displays one or more identifiers, wherein each of the one or more identifiers is displayed as data which identifies a corresponding one of the computing devices in the online conference.

19. The computer readable memory or storage device of claim 18, wherein the first and second regions are displayed along with a boundary that represents the first display resolution.

* * * * *